US010367421B1

(12) United States Patent
Ahmed et al.

(10) Patent No.: US 10,367,421 B1
(45) Date of Patent: Jul. 30, 2019

(54) METHOD AND SYSTEM FOR GRID-CONNECTED CONVERTER SYNCHRONIZATION FAULT PREVENTION WITH RECOVERY

(71) Applicant: Emirates Steel Industries Co. PJSC, Musaffah, Abu Dhabi (AE)

(72) Inventors: Hany Abdelmonem Hamed Ahmed, Mohammed Ben Zayed (AE); Ahmed Fathi Ahmed Abdou, Ngunnawal (AU); Ehab Hassan Eid Bayoumi, Cairo (EG); Elwy Eissa Ahmed Elkholy, Menofia Governorate (EG)

(73) Assignee: Emirates Steel Industries Co. PJSC, Musaffah, Abu Dhabi (AE)

( * ) Notice: Subject to any disclaimer, the term of this patent is extended or adjusted under 35 U.S.C. 154(b) by 0 days.

(21) Appl. No.: 16/161,490

(22) Filed: Oct. 16, 2018

(51) Int. Cl.
*H02M 3/335* (2006.01)
*H02M 1/02* (2006.01)
*H02M 1/00* (2006.01)

(52) U.S. Cl.
CPC ......... *H02M 3/33507* (2013.01); *H02M 1/02* (2013.01); *H02M 2001/0003* (2013.01)

(58) Field of Classification Search
CPC ............... H02M 3/33507; H02M 1/02; H02M 2001/0003; H02P 23/08; H02P 2201/09; H02P 27/04
See application file for complete search history.

(56) References Cited

U.S. PATENT DOCUMENTS

2014/0265596 A1* 9/2014 Yuan .................. H02J 3/382
307/69

* cited by examiner

*Primary Examiner* — Adolf D Berhane
*Assistant Examiner* — Afework S Demisse
(74) *Attorney, Agent, or Firm* — Sughrue Mion, PLLC (57) ABSTRACT

A method and system of controlling a power converter coupled between one of a motor drive inverter and a grid-tie inverter within an electric grid. The method comprises operating the power converter in a first PLL control mode that establishes a state of synchronization with the electric grid, detecting a grid disturbance voltage dip event; keeping the power converter synchronized and preserving charge of a set of dc-link capacitors, switching from the first PLL control mode to a second PLL control mode of operation of the power converter to obtain fast re-synchronization after dip period ends, and reverting to operation in the first PLL control mode upon re-establishing of the state of synchronization.

18 Claims, 7 Drawing Sheets

METHOD AND SYSTEM FOR GRID-CONNECTED CONVERTER SYNCHRONIZATION FAULT PREVENTION WITH RECOVERY

TECHNICAL FIELD

The disclosure herein relates to methods and systems for controlling a power converter coupled between a power generator and an electric grid.

BACKGROUND

Electrical grids are susceptible to severe short duration voltage dips that frequently result in tripping of power converters, resulting in adverse effects upon industrial manufacturing facilities and other grid customers. The reason for the converter trip is typically a synchronization error or synchronization loss between converter and grid that is caused by the severe short duration voltage dip. Since converters need a relatively long time to resume its normal operation after dip recovery due to the capacitors undergoing requisite pre-charging process, converter control solutions which may minimize or substantially eliminate the converter recovery time are highly desired.

DETAILED DESCRIPTION

The disclosure herein provides novel and advantageous hybrid phase locked loop (PLL)-based control schemes that achieve a very fast synchronization between a grid and power converter to preempt, and avoid, an initial loss of synchronization due to a severe short duration voltage dip. The power converter synchronization scheme utilizes a delayed signal cancellation (DSC) PLL scheme to enhance the grid angle estimation during the dip period to anticipate and preempt a loss of synchronization between power converter and grid, to avoid a converter trip and keep the converter operational during the voltage dip period. This scheme utilizes a dip detector algorithm to control the hybrid operation of the synchronization controller. This scheme pre-empts loss of synchronization of converter with grid (the synchronization fault), recovering the converter quickly during the voltage dip period. A hybrid structure PLL converter control method and system utilizes a single-input fuzzy logic controller (SFLC) PLL scheme to achieve a very fast synchronization after the dip period. The converter resumes normal operation once the dip period ends without loss of synchronization, in a faster timeframe.

Provided is a method of controlling a power converter coupled to one of a motor drive inverter and a grid-tie inverter within an electric grid. The method comprises operating the power converter in a first PLL control mode that establishes a state of synchronization with the electric grid, detecting a grid disturbance voltage dip event, continuing using the first PLL which mitigates the grid disturbance effect on the control loop, switching from the first PLL control mode to a second PLL control mode of operation of the power converter for obtaining a fast state of synchronization, and reverting to operation in the first PLL control mode upon re-establishment of the state of synchronization.

In one embodiment, the first PLL mode comprises a delayed signal cancellation (DSC) PLL.

In another embodiment, the second PLL control mode of operation of the power converter comprises a single input fuzzy logic controller (SFLC).

In another embodiment, reverting to operation in the first PLL control mode is based at least in part upon detecting a synchronization signal positive edge.

In yet another embodiment, reverting to operation in the first PLL control mode is performed after a programmed one cycle delay time to ensure a smooth transition between the second and the first PLL control modes.

Also provided is a power converter control module coupled to one of a motor drive inverter and a grid-tie inverter within an electrical grid. The power converter control module includes a processor, and a memory storing instructions. The instructions are executable in the processor to operate the power converter in a first PLL control mode that establishes a state of synchronization with the electric grid, detect a grid disturbance voltage dip event, switch from the first PLL control mode to a second PLL control mode of operation of the power converter, and revert to operation in the first PLL control mode upon re-establishment of the state of synchronization.

Further provided is a non-transitory computer readable memory storing instructions. The instructions are executable in the processor to operate the power converter in a first PLL control mode that establishes a state of synchronization with the electric grid, detect a grid disturbance voltage dip event, continuing using the first PLL which mitigates the grid disturbance effect on the control loop, switch from the first PLL control mode to a second PLL control mode of operation of the power converter, for obtaining a fast state of synchronization, and revert to operation in the first PLL control mode upon re-establishment of the state of synchronization.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include one or more processors and various forms of memory for storing data and processor-executable instructions. Embodiments described herein may be implemented in the form of computer processor-executable logic instructions or programs stored on computer memory mediums.

Figure 1:
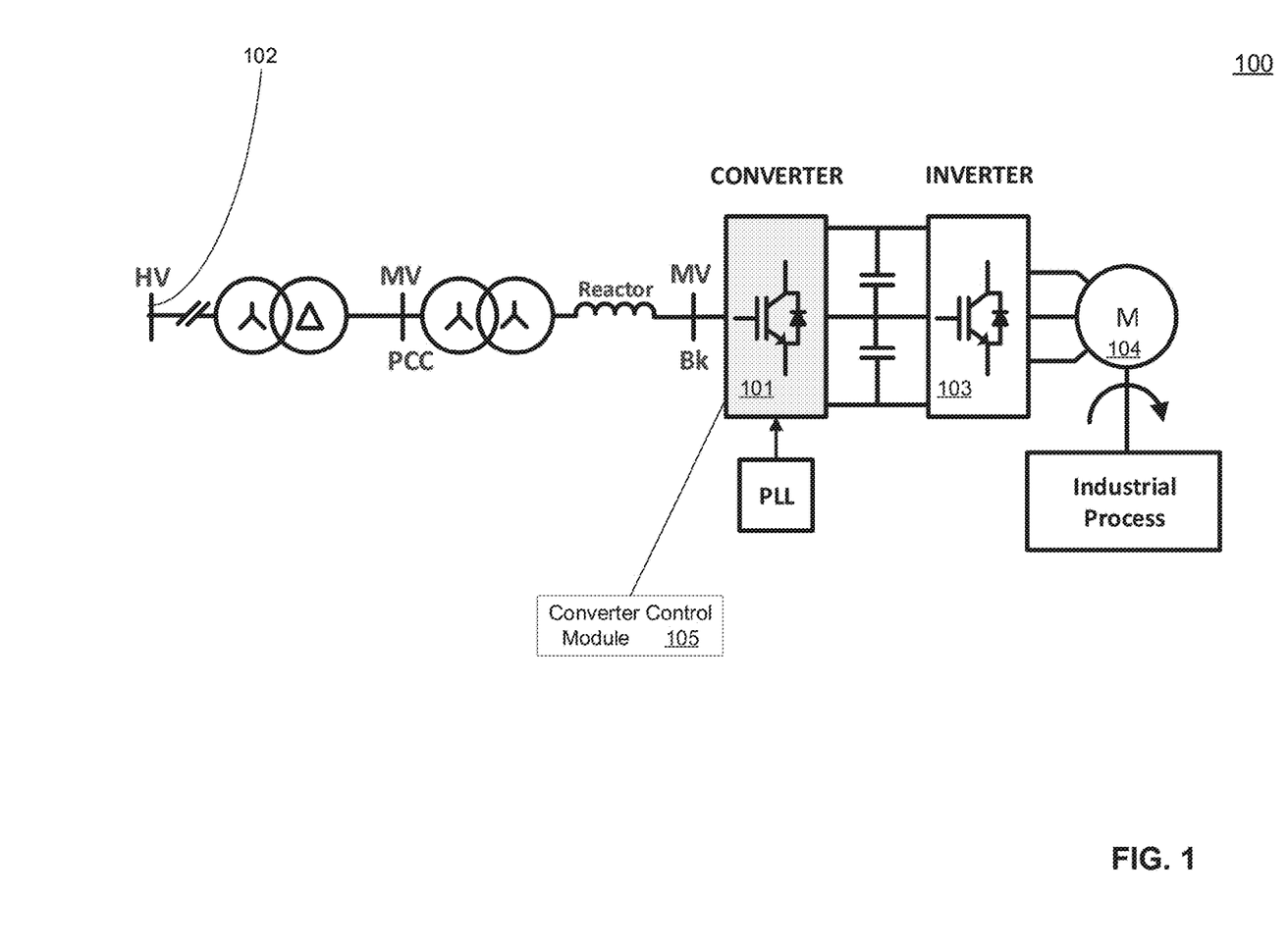
FIG. 1 illustrates an example embodiment of a grid-connected power converter.

FIG. 1 illustrates, in an example embodiment 100, a grid-connected power converter 101. Power converter 101 is electrically connected with electrical grid 102, and to AC motor 104. AC inverter device 103, which includes dc-link capacitor devices in one embodiment, may be electrically interposed between power converter 101 and AC inverter 103 and AC motor 104. Power converter 101 may be electrically controlled via converter controller 105 that incorporates a synchronization control module 105. Converter synchronization control module 105 may include any combination of hardware elements, electrical circuitry and encoded software instructions, in one example embodiment, a processor and a non-transient memory storing instructions executable in the processor to control functioning and response of power converter 101 within electrical grid 102. In one embodiment, converter controller and synchronization control module 105 may include capability for operating power converter 101 under hybrid phase locked loop (PLL) modes of control.

Figure 2A:
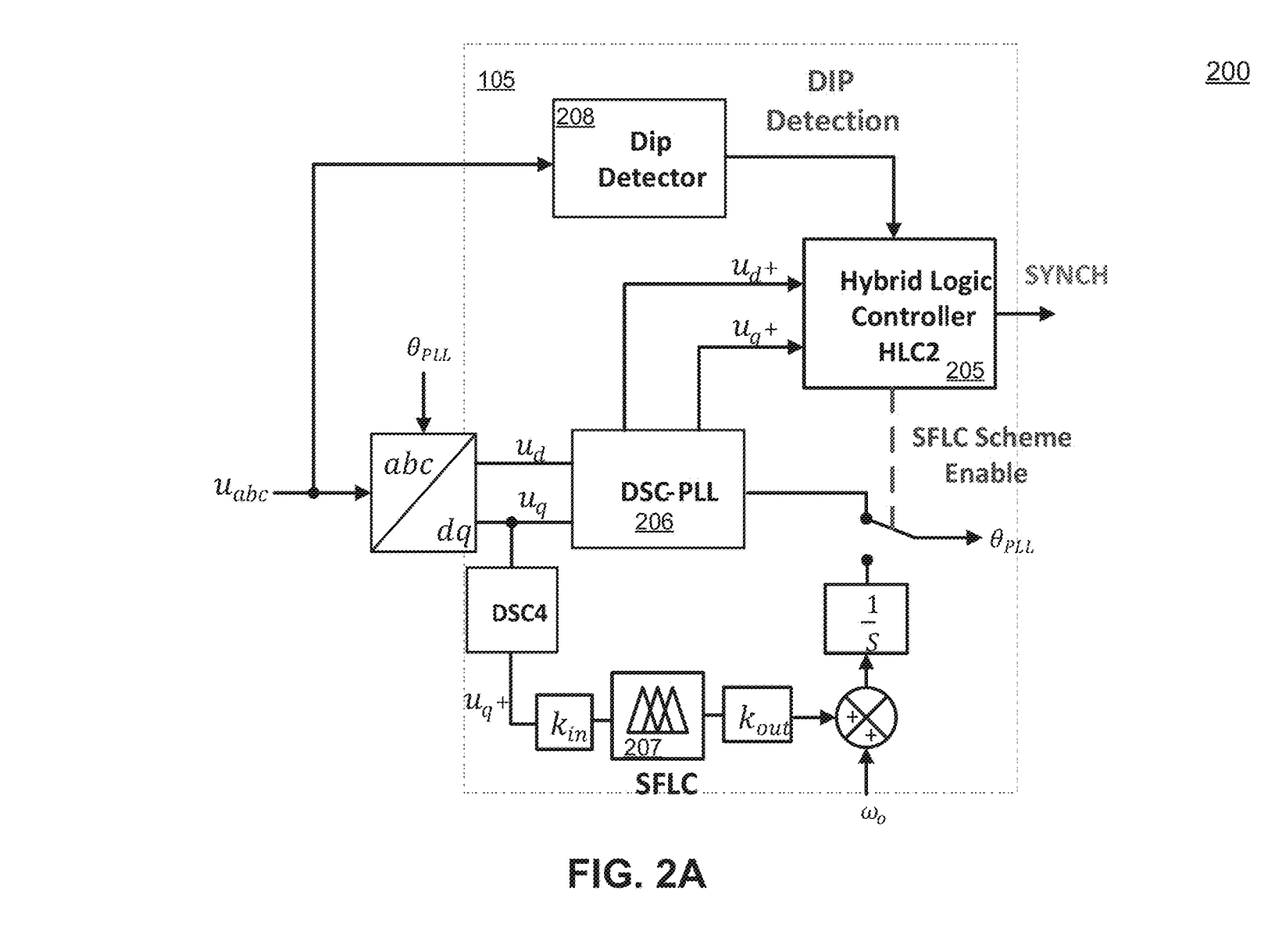
FIG. 2A illustrates an example embodiment architecture of a power converter synchronization control module.

FIG. 2A illustrates, in one example embodiment, an architecture 200 of power converter synchronization control module 105. The hybrid control structure of power converter synchronization control module 105 of FIG. 2 includes two control blocks in conjunction with hybrid logic controller 205. The first control block is a delayed signal cancellation (DSC) PLL 206. The DSC-PLL 206 is the main synchronization scheme during normal operation, tracking both the grid voltage phase angle and the grid frequency for reference signal generation for the converter controller modules. In one embodiment, a severe short duration voltage dip may be detected by evaluating the negative sequence component of the grid voltage dq-axis value and determining whether that dq-axis value of the grid voltage breaches a threshold limit.

Hybrid logic controller 205 uses the delayed signal cancellation (DSC) block as a pre-filter to cancel the effect of negative sequence component during voltage dip period and similarly, some selective background harmonics effect, and to avoid the synchronization fault by extracting the positive sequence component of the grid voltage during the dip period. This scheme is able to cancel the double frequency oscillation in the estimated grid angle. The scheme of FIG. 2 can accurately estimate the grid angle under normal and during the fault periods. The DSC-PLL, in one embodiment, is implemented with a delay factor time equal to $T_o/4$ to cancel the negative sequence ripple effect as well as it can filter a wide range of low order harmonics.

The second block utilizes a single input fuzzy logic controller (SFLC) 207 to quickly estimate the grid angle once the voltage dip is cleared or recovered. Controller gain or scaling factors $k_{in}$ and $k_{out}$ are used to control the dynamic response of SFLC control mode 207. Hybrid logic controller 205 controls the SFLC scheme 207 by monitoring the $u_d^+$ and $u_q^+$ of the grid voltage and generates the synchronization signal as well as the switching signal to enable SFLC scheme 207. Hybrid logic controller 205 engages the fuzzy logic controller (SFLC) 207 scheme once the voltage dip is cleared and reverts to DSC-PLL 206 scheme once synchronization is re-established between grid and power converter.

Figure 2B:
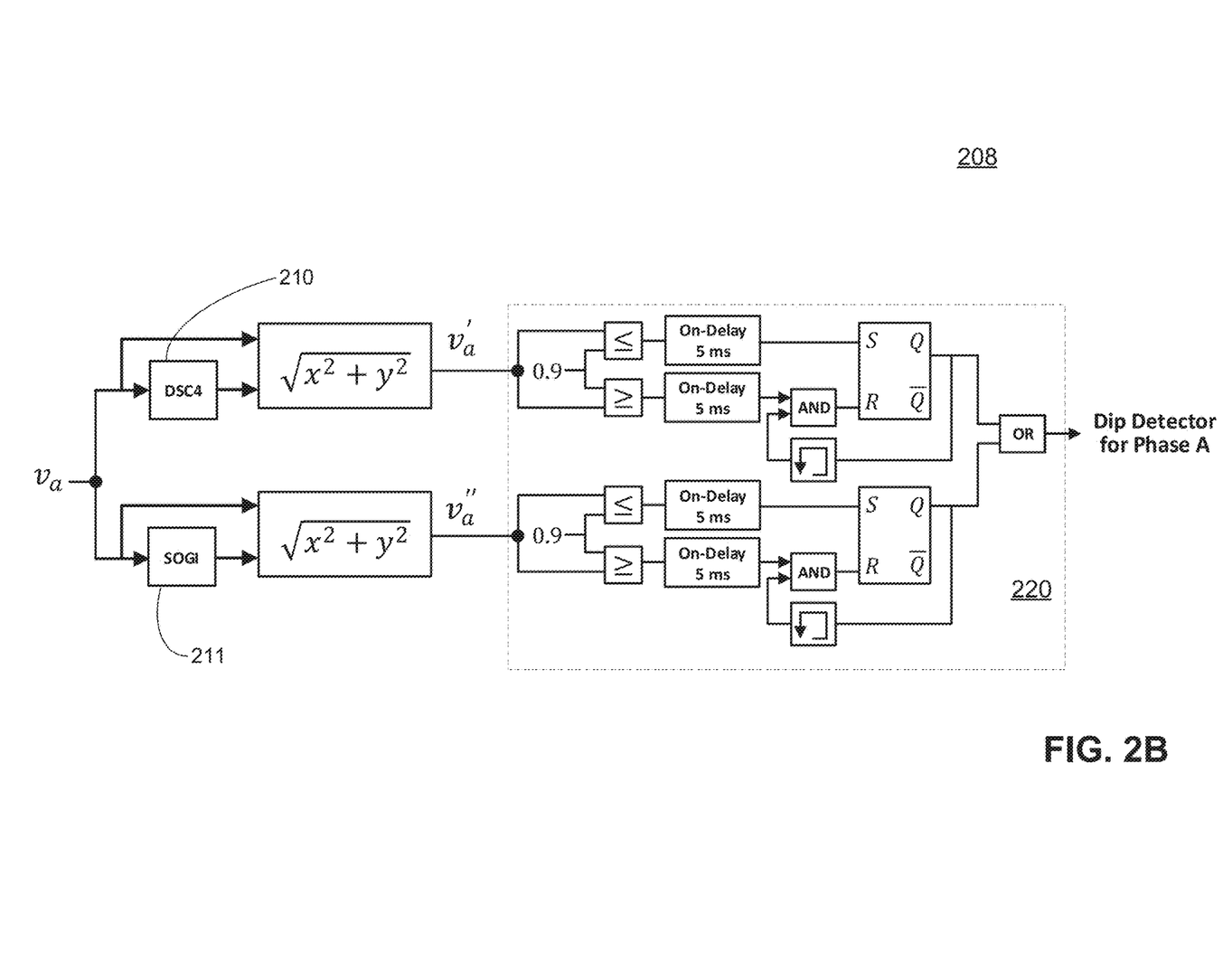
FIG. 2B illustrates an example embodiment architecture of a voltage dip detector scheme of the power converter synchronization control module.

FIG. 2B illustrates, in one example embodiment, an architecture of the voltage dip detector 208 of power converter synchronization control module 105. Dip detector 208 may apply two pre-filters blocks in parallel, first, a delayed signal cancellation (DSC) block 210, and second, a second order generalized integrator (SOGI) pre-filter block 211. Both signals generated from DSC 210 and SOGI 211 are processed in block 220 which selects the fastest signal (either from DSC or SOGI loop) to generate a voltage dip detection signal for each phase. Block 220 may include logic and memory components such as a comparator, on-delay timer, execution cycle memory, logic blocks and RS Flip Flop, in an embodiment.

When the end of the voltage dip is detected by voltage dip detector 208, hybrid logic controller 205 invokes the DSC-SFLC scheme for fast re-synchronization. The SFLC-DSC scheme is invoked and operational until the system reaches the synchronization state ($u_d^+$ and $u_q^+$ signals become inside their synchro-band, for instance, the d-axis voltage component $u_d^+ > 0.98$ pu and the absolute value of q-axis voltage component $|u_q^+| < 0.01$ pu) in an example embodiment. Once the synchronization signal positive edge is detected, the hybrid logic controller 205 switches back to DSC scheme 206 after a programmed one cycle delay time to ensure that DSC scheme 206 angle error is nearly zero, so smooth transition between the two schemes is obtained. Then, converter 101 resumes its normal operation under DSC-PLL scheme 206.

The SFLC 207 control mode may be kept operational and online until the synchronization is re-established for normal operation, whereupon the conventional DSC-PLL 206 control mode may be invoked and re-enabled. The control scheme of converter synchronization control module 105 intends to resynchronize the power converter 101 with the electrical grid quickly, in one embodiment in less than 0.02 second (20 milliseconds), to avoid loss of synchronization with converter tripping consequences.

Figure 2C:
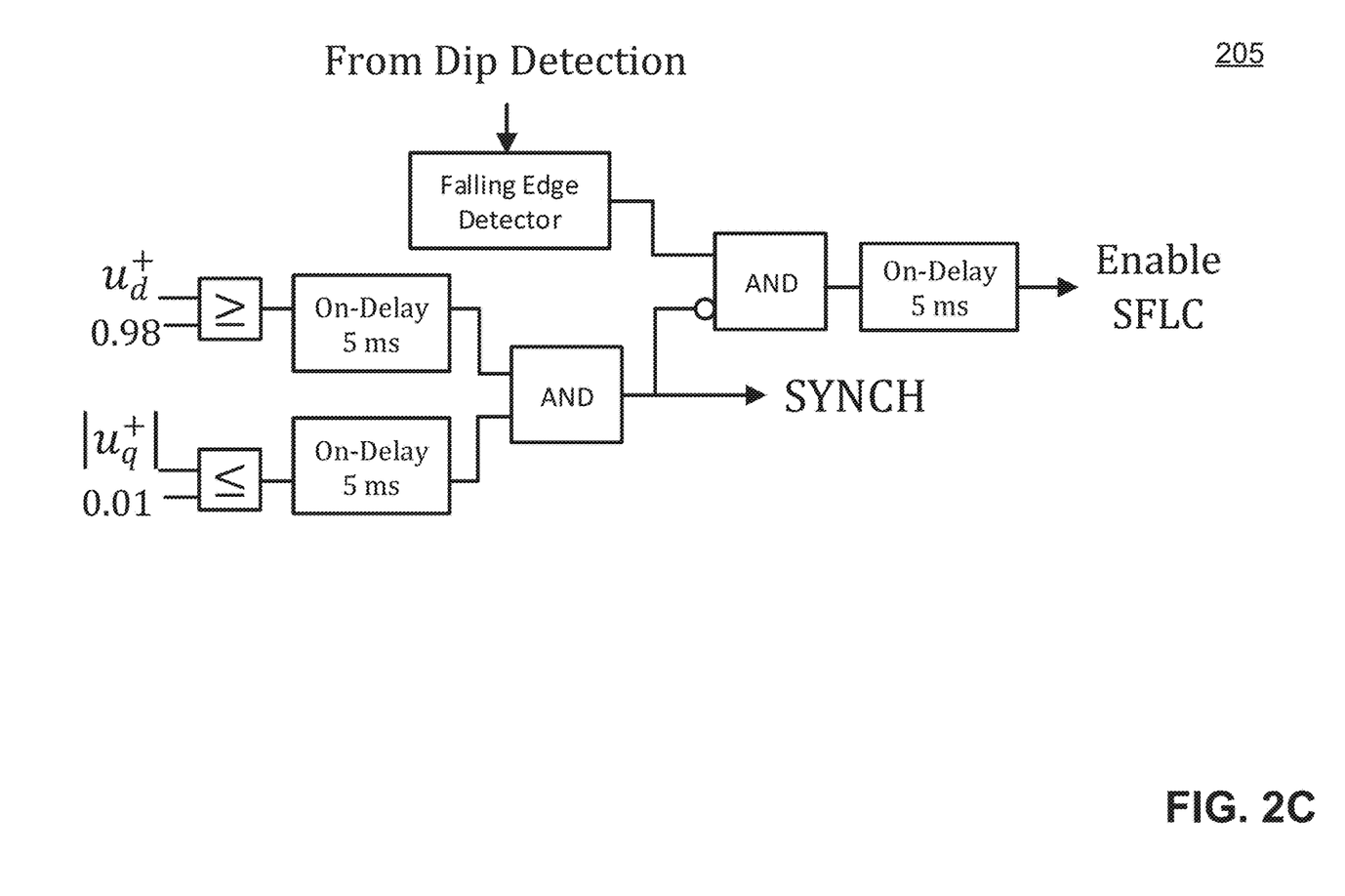
FIG. 2C illustrates an example embodiment architecture of a hybrid controller scheme of the power converter synchronization control module.

FIG. 2C illustrates, in an example embodiment, an architecture of a hybrid controller scheme 250 of the power converter synchronization control module. The hybrid logic controller controls the SFLC mode 207 by monitoring the $u_d^+$ and $u_q^+$ of the grid voltage and generates the synchronization signal as well as the switching signal to enable the SFLC mode 207. The on-delay block is inserted with 5 ms as the DSC block updates its output after 5 ms delay hence, the delay is inserted to ensure a correct decision of the hybrid controller and also to avoid denouncing.

Figure 3:
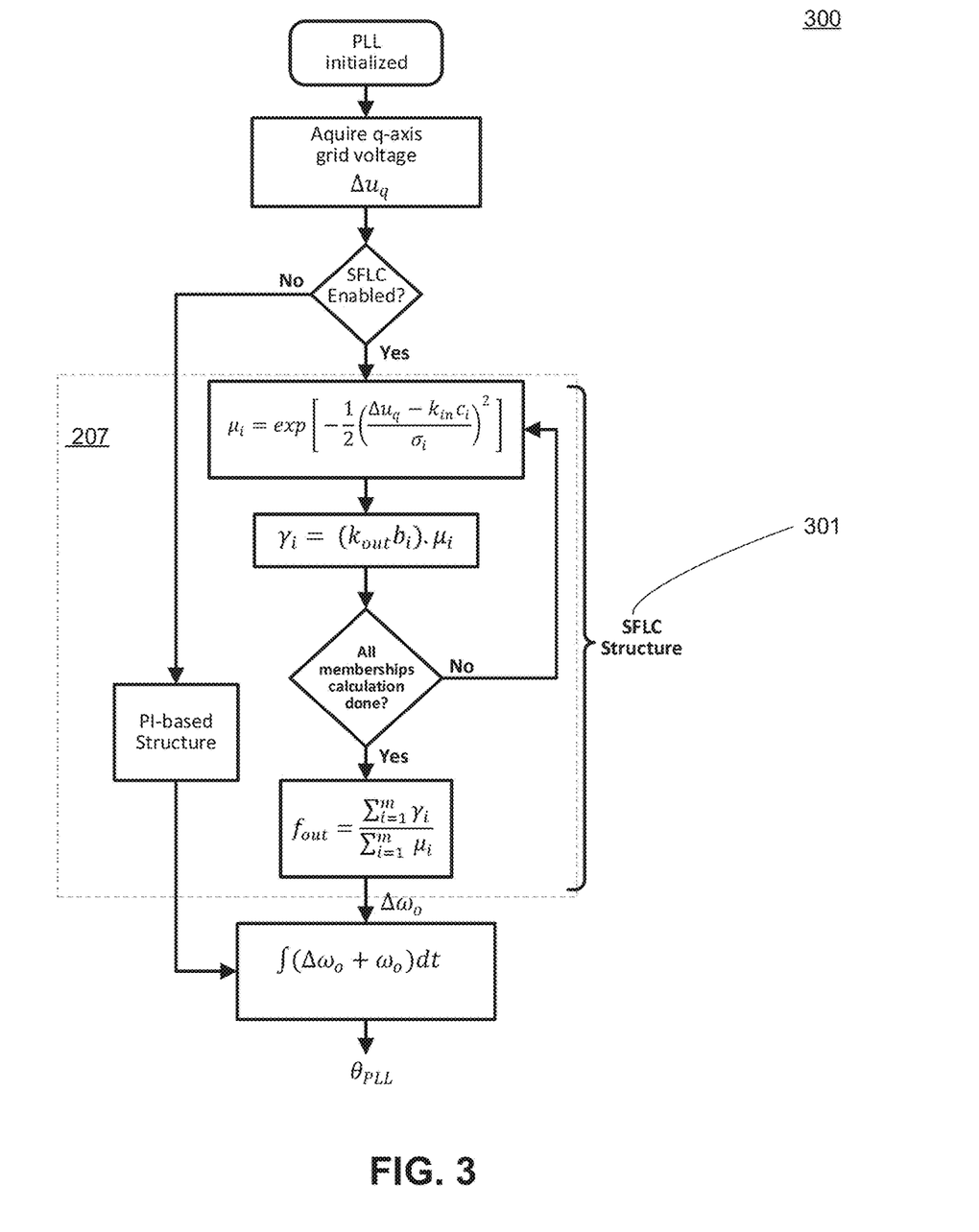
FIG. 3 illustrates, in an example embodiment, a single input fuzzy logic control module.

FIG. 3 illustrates an algorithm structure 301 of single input fuzzy logic control (SFLC) module 207, in example embodiment 300. The SFLC uses $\Delta u_q$ as an error signal. The fuzzification process is performed by a Gaussian membership function given as $$\mu(x) = \exp\left(-\frac{(c-x)^2}{2\sigma^2}\right)$$

where c and σ are the centre and width of the Gaussian function respectively.

The output of the SFLC 301 is ($\Delta\omega_o$). The estimated angle ($\theta_{PLL}$) is calculated from $$\theta_{PLL} = \int(\omega_o + \Delta\omega_o)$$

where $\omega_o$ is the grid angular frequency. The input signal $\Delta u_q$ is fuzzified by 'i' membership functions according to the distance between the input and the membership centre value $c_i$ as follows $$\mu_i = \exp\left[-\frac{1}{2}\left(\frac{x-c_i}{\sigma_i}\right)^2\right]$$

The SFLC output is calculated by a crisp function using the weighted average method, where $b_i$ is the output membership function centers. The input signal is scaled by gain $k_{in}$ while the output of SFLC is scaled by a gain $k_{out}$ $$\mu_i = \exp\left[-\frac{1}{2}\left(\frac{\Delta u_q - k_{in}c_i}{\sigma_i}\right)^2\right]$$
$$\gamma_i = (k_{out}b_i)\cdot\mu_i$$

The output is calculated as $$\Delta\omega_o = \frac{\sum_{i=1}^{m}\gamma_i}{\sum_{i=1}^{m}\mu_i}$$

The algorithm of the SFLC 301 is called for each execution sample to obtain the proper $\Delta\omega_o$. Five Gaussian membership functions are used with a σ of 0.5. The membership centers are equally distributed from −1 to 1 range. The output centers, vector $b_i$ also consists of 5 crisps, equally distributed similarly. A scaling factors $k_{in}$ and $k_{out}$ are used to control the SFLC dynamic response of SFLC control mode 207.

Figure 4:
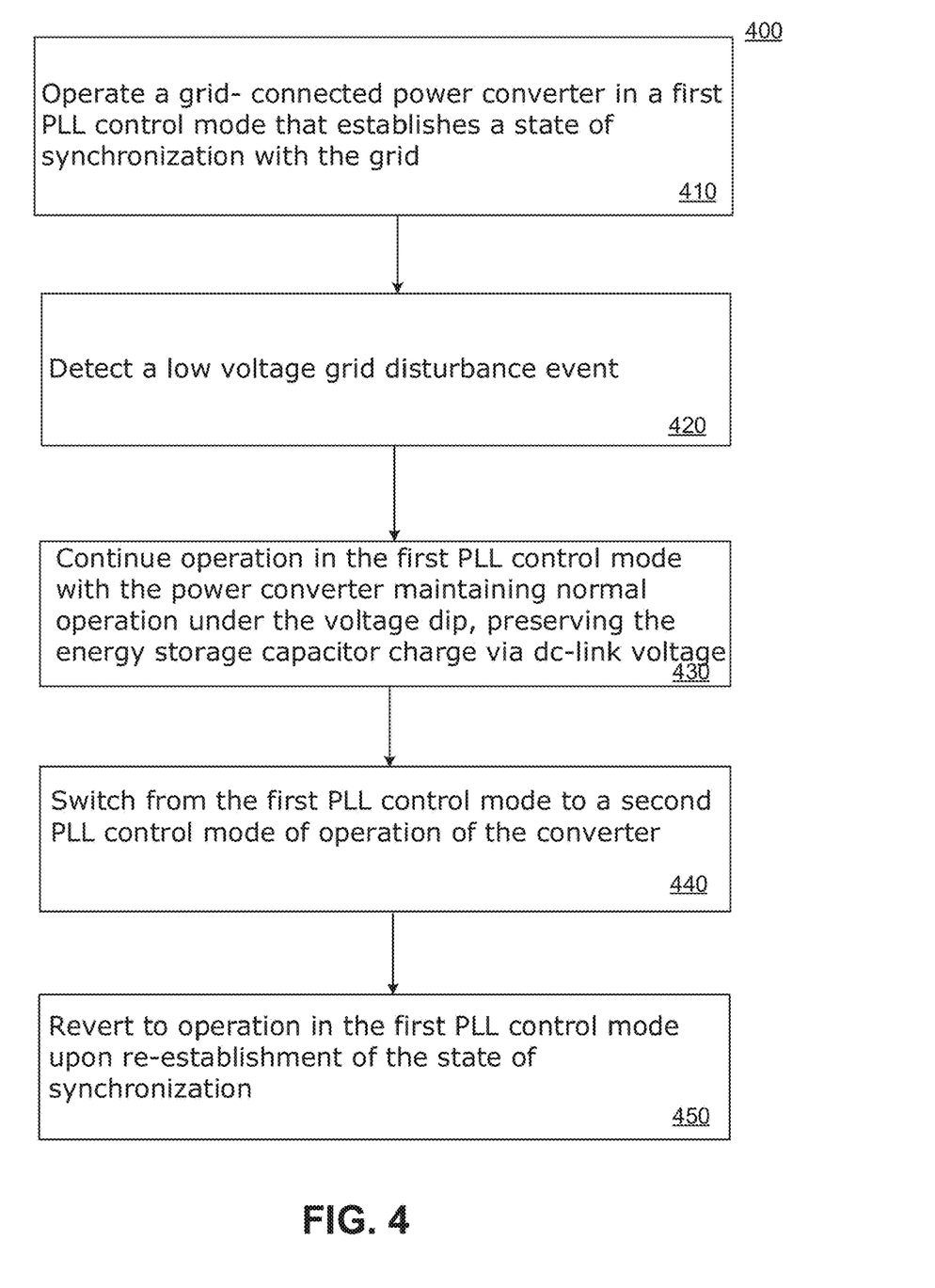
FIG. 4 illustrates an example embodiment method of operation of a power converter synchronization control module.

FIG. 4 illustrates, in an example embodiment method 400 of FIG. 4, a method of operation of a power converter synchronization control module 105. In describing the example of FIG. 4, reference is made to the examples of FIGS. 1-3 for purposes of illustrating suitable components or elements for performing a step or sub-step being described.

At step 410, operating the power converter 101 in a DSC-PLL 206 control mode that establishes a state of synchronization with the electric grid 102.

In another embodiment, the first PLL control mode 206 comprises a delayed signal cancellation (DSC) PLL.

At step 420, detecting a grid disturbance voltage dip event at electric grid 102.

In one embodiment, a severe short duration voltage dip may be detected by evaluating the negative sequence component of the grid voltage dq-axis value and determining whether that dq-axis value of the grid voltage breaches a threshold limit.

At step 430, continue operation with the first PLL control mode 206, under which power converter 101 maintains normal operation under the voltage dip, thereby preserving a charged state of the dc-link capacitors via dc-link voltage.

At step 440 switching from the first PLL control mode 206 to a second PLL control mode 207 of operation of the power converter 101 when dip period end is detected using dip detector 208.

In an embodiment, the second PLL control mode 207 of operation of the power converter 101 comprises a single input fuzzy logic controller (SFLC) 301.

At step 450, reverting to operation in the first DSC-PLL control mode 206 upon re-establishment of the state of synchronization between power converter 101 and electric grid 102.

In one embodiment, reverting to operation in the first PLL control mode 206 is based at least in part upon detecting a synchronization established signal positive edge.

In another embodiment, reverting to operation in the first PLL control mode 206 after a programmed one cycle delay time to ensure a smooth transition between the second and the first PLL control modes.

In another variation, the method further comprises re-establishing the state of synchronization of power converter 101 with electric grid 102, by hybrid logic controller 205 while in SFLC 207 control mode, within a relatively short duration, such as less than 0.01 second in one embodiment, after clearance of the voltage dip event.

In other embodiments, the method steps described may be embodied as processor-executable instructions stored in a non-transitory storage medium or memory and incorporated into, or made communicatively accessible to, any one or more of an electrical grid controller device, a power converter controller device, a terminal computing device or a server computing device.

Figure 5A:
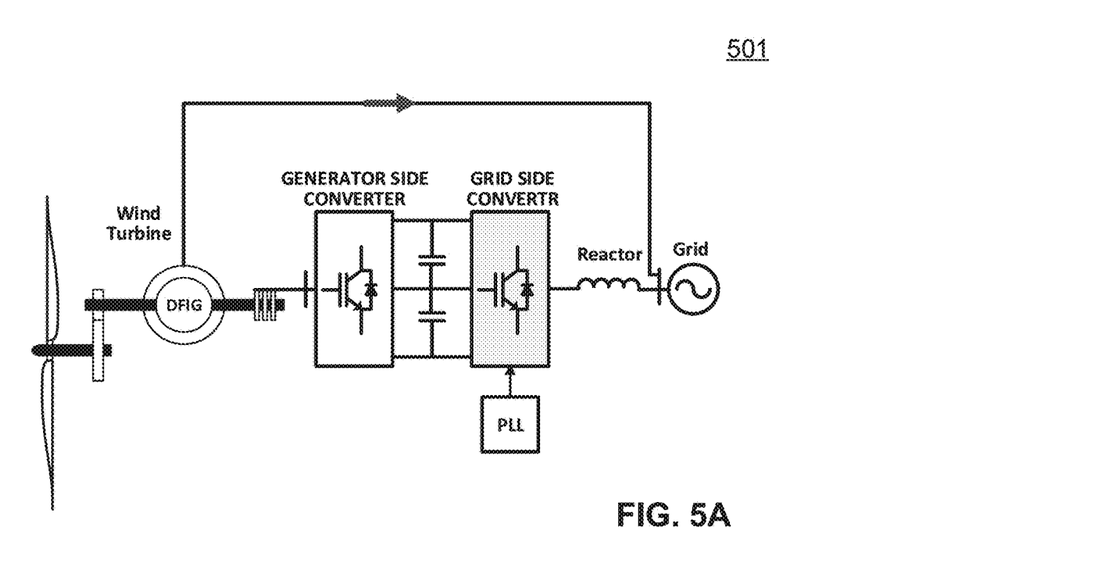
FIG. 5A illustrates a further example application case of the invention herein to a grid-connected converter for wind turbine system.
Figure 5B:
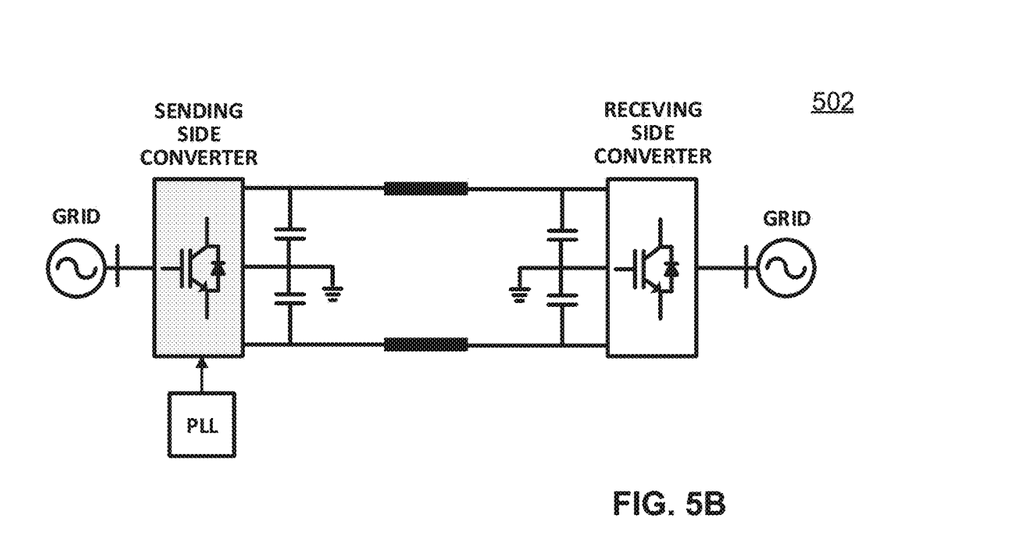
FIG. 5B illustrates a further example application case of the invention herein to a grid-connected converter for HVDC system.

It is contemplated for embodiments described herein to extend to individual elements and concepts described herein, independently of other concepts, ideas or system, and also for the embodiments to include combinations of elements recited throughout this application. Although embodiments are described in detail herein with reference to the accompanying drawings, it is contemplated that the invention is not limited to such embodiments. As such, many modifications and variations will be apparent to practitioners skilled in this art. For instance, and by way of illustration of additional examples of applying the invention disclosed herein, FIG. 5A illustrates a further example application case of the invention herein to a grid-connected converter for wind turbine system 501. FIG. 5B illustrates a further example application case of the invention herein to a grid-connected converter for HVDC system 502.

Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, any absence of describing combinations should not preclude the inventors from claiming rights to such combinations.

What is claimed is:

1. A method of controlling a power converter coupled to one of a motor drive inverter and a grid-tie inverter within an electric grid, the method comprising:
    operating the power converter in a first PLL control mode that establishes a state of synchronization with the electric grid;
    detecting, by a dip detector circuit, a grid disturbance voltage dip event;
    switching from the first PLL control mode to a second PLL control mode of operation of the power converter; and
    reverting to operation in the first PLL control mode upon re-establishing the state of synchronization.

2. The method of claim 1 wherein the first PLL mode comprises a delayed signal cancellation (DSC) PLL.

3. The method of claim 1 wherein reverting to operation in the first PLL control mode is based at least in part upon detecting a synchronization signal positive edge by the dip detector circuit.

4. The method of claim 1 wherein the second PLL control mode of operation of the power converter comprises a single input fuzzy logic controller (SFLC).

5. The method of claim 1 further comprising reverting to operation in the first PLL control mode after a programmed one cycle delay time to ensure a smooth transition between the second and the first PLL control modes.

6. The method of claim 1 wherein the state of synchronization is re-established within 0.01 second after clearance of the grid disturbance voltage dip event.

7. A power converter control module coupled to one of a motor drive inverter and a grid-tie inverter including a set of dc-link capacitors within an electrical grid, the power converter control module comprising:
   a processor;
   a memory storing instructions executable in the processor to:
      operate the power converter in a first PLL control mode that establishes a state of synchronization with the electric grid;
      detect, by a dip detector circuit, a grid disturbance voltage dip event;
      switch from the first PLL control mode to a second PLL control mode of operation of the power converter; and
      revert to operation in the first PLL control mode upon re-establishing the state of synchronization.

8. The power converter control module of claim 7 wherein the first PLL mode comprises a synchronous reference frame (DSC) PLL.

9. The power converter control module of claim 7 wherein the instructions are further executable to revert to operation in the first PLL control mode based at least in part upon detecting a synchronization signal positive edge by the dip detector circuit.

10. The power converter control module of claim 7 wherein the second PLL control mode of operation of the power converter comprises a single input fuzzy logic controller (SFLC).

11. The power converter control module of claim 7 further comprising instructions executable in the processor to revert to operation in the first PLL control mode after a programmed one cycle delay time to ensure a smooth transition between the second and the first PLL control modes.

12. The power converter control module of claim 7 wherein the instructions are executable in the processor to re-establish the state of synchronization within 0.01 second after clearance of the grid disturbance voltage dip event.

13. A non-transitory computer readable memory storing instructions, the instructions executable in a processor to:
   operate a power converter in a first PLL control mode that establishes a state of synchronization with an electric grid;
   detect, using a dip detector circuit, a grid disturbance voltage dip event;
   switch from the first PLL control mode to a second PLL control mode of operation of the power converter; and
   revert to operation in the first PLL control mode upon re-establishing the state of synchronization.

14. The non-transitory computer readable memory of claim 13 wherein the first PLL mode comprises a synchronous reference frame (DSC) PLL.

15. The non-transitory computer readable memory of claim 13 wherein the instructions are further executable to revert to operation in the first PLL control mode based at least in part upon detecting a synchronization signal positive edge by the dip detector circuit.

16. The non-transitory computer readable memory of claim 13 wherein the second PLL control mode of operation of the power converter comprises a single input fuzzy logic controller (SFLC).

17. The non-transitory computer readable memory of claim 13 further comprising instructions executable in the processor to revert to operation in the first PLL control mode after a programmed one cycle delay time to ensure a smooth transition between the second and the first PLL control modes.

18. The non-transitory computer readable memory of claim 13 wherein the instructions are executable in the processor to re-establish the state of synchronization within 0.01 second after clearance of the grid fault event.

\* \* \* \* \*